United States Patent [19]
Uhler et al.

[11] Patent Number: 5,500,947
[45] Date of Patent: Mar. 19, 1996

[54] OPERAND SPECIFIER PROCESSING BY GROUPING SIMILAR SPECIFIER TYPES TOGETHER AND PROVIDING A GENERAL ROUTINE FOR EACH

[75] Inventors: George M. Uhler, Marlborough; John F. Brown, III, Northborough, both of Mass.

[73] Assignee: Digital Equipment Corporation, Maynard, Mass.

[21] Appl. No.: 269,991

[22] Filed: Jul. 1, 1994

Related U.S. Application Data

[63] Continuation of Ser. No. 681,434, Apr. 3, 1991, abandoned, which is a continuation of Ser. No. 212,348, Jun. 27, 1988, abandoned.

[51] Int. Cl.$^6$ ........................................................... G06F 9/24
[52] U.S. Cl. .................... 395/375; 395/800; 364/DIG. 2; 364/946.2; 364/946.6; 364/955; 364/955.1; 364/955.3; 364/955.6; 364/957.7; 364/957; 364/965.5; 364/964.22
[58] Field of Search ................................. 395/375, 800; 364/946.2, 946.6, 955, 955.1, 955.3, 955.6, 957.7, 957, 965.5, 964.22

[56] References Cited

U.S. PATENT DOCUMENTS

| | | | |
|---|---|---|---|
| Re. 32,493 | 9/1987 | Matsumoto et al. | 364/200 |
| 3,958,221 | 5/1976 | Serra et al. | 395/375 |
| 4,236,206 | 11/1980 | Stecker et al. | |
| 4,312,034 | 1/1982 | Gunter et al. | 395/375 |
| 4,320,454 | 3/1982 | Suzuki et al. | 395/375 |
| 4,342,078 | 7/1982 | Tredennick et al. | 395/375 |
| 4,415,969 | 11/1983 | Bayliss et al. | 395/375 |
| 4,530,050 | 7/1985 | Fukunaga et al. | 364/200 |
| 4,586,130 | 4/1986 | Butts, Jr. et al. | |
| 4,633,390 | 12/1986 | Yoshida | 395/375 |
| 4,709,324 | 11/1987 | Kloker | 364/200 |
| 4,763,246 | 8/1988 | Holt et al. | 395/375 |
| 4,807,113 | 2/1989 | Matsumoto et al. | 364/200 |
| 4,812,971 | 3/1989 | Butts, Jr. et al. | 364/200 |
| 4,825,355 | 4/1989 | Kurakazu et al. | 364/200 |
| 4,884,196 | 11/1989 | Thiel et al. | 364/200 |
| 4,897,787 | 1/1990 | Kawasaki et al. | 395/375 |
| 5,077,659 | 12/1991 | Nagata | 395/375 |

FOREIGN PATENT DOCUMENTS

| | | |
|---|---|---|
| 0325226 | 7/1969 | European Pat. Off. |
| 0087785 | 7/1983 | European Pat. Off. |

OTHER PUBLICATIONS

Sudhindra N. Mishra, "The VAX 8800 Microarchitecture", Digital Technical Journal, Feb. 1987, pp. 20–32.
Mario Troiani et al, "The VAX 8600 I Box, A Pipelined Implementation of the VAX Architecture", Digital Technical Journal, Aug. 1985, pp. 24–42.
Matsumoto et al, "A high–performance architecture for variable length instructions", Systems and Computers in Japan, No. 3, May–Jun. 1985, pp. 19–28.

*Primary Examiner*—Thomas G. Black
*Assistant Examiner*—Jack M. Choules
*Attorney, Agent, or Firm*—Arthur W. Fisher; Denis G. Maloney; Joanne N. Pappas

[57] ABSTRACT

A method of specifying the operands for a microcoded CPU employs a combination of a set of microinstruction routines for generic operand modes, along with hardware primitives for selecting various specific types of operand treatment. Decoding of a machine-level instruction produces an entry point for the microstore, selecting one of the set of generic operand modes. Also, decoding of the instruction produces control bits that are used directly to select the specific operand type or used by the hardware primitives. In this way, branching is avoided in the microinstruction sequences used for operand specifying, but yet the amount of microcode needed is a minimum.

20 Claims, 1 Drawing Sheet

FIG. 1

OPERAND SPECIFIER PROCESSING BY GROUPING SIMILAR SPECIFIER TYPES TOGETHER AND PROVIDING A GENERAL ROUTINE FOR EACH

This application is a continuation of application Ser. No. 07/681,434 filed Apr. 3, 1991, now abandoned, which is a continuation of Ser. No. 07/212,348 filed Jun. 27, 1988, now abandoned.

FIELD OF THE INVENTION

This invention relates generally to the operation of digital computers, and in particular relates to the implementation of complex instruction sets in high performance computer systems.

BACKGROUND OF THE INVENTION

In its simplest form, a digital computer consists of five functionally independent main parts: input, memory, arithmetic and logic, output, and control units. In the traditional organization of a so-called 'single store' or 'stored program' computer, activity within the computer is governed by a program consisting of a set of instructions stored in main memory. An instruction specifies an operation to be performed by the computer. Individual instructions are brought from main memory into the processor, which decodes and executes them. In addition to the machine-level instructions, numerical data used as operands for the instructions are also stored in the same main memory space, hence the name 'single store' computer.

In modern computers, the arithmetic and logic unit (ALU) and its associated control circuitry are frequently grouped together to form a so-called central processing unit, or CPU, which can be implemented as a monolithic semiconductor device. A CPU usually contains, in addition to the ALU, a collection of one-word storage locations, called registers, used to hold instructions or data during program execution. Some CPU registers are all-purpose storage locations which can be used to hold any intermediate values which the CPU might need to temporarily save. Other registers have specifically defined uses. For example, a CPU traditionally has a register called the program counter (PC) which holds the address in the main memory space of the next (or currently executing) instruction. In addition, a CPU will typically have an instruction register (IR) which holds the instruction fetched from memory that is currently being executed by the computer. A CPU will also usually have additional special purpose registers, such as a memory address register and a memory data register, which are defined to contain, respectively, the main memory address of a word to be written or read by the CPU, and a data value to be stored in or received from memory. Each of the functional units of a CPU is able to pass data to and from other units via one or more CPU busses, and transfers between the units are initiated and controlled by the control unit. The sequence of individual steps required for a computer to execute a machine-level instruction is directed by a control unit, which is responsible for asserting control signals to initiate transfers of data from one register to another, or between main memory and registers, or between registers and the ALU, via a CPU bus.

Often, a single machine level instruction involves several CPU register transfers, each initiated by the assertion of one or more control signals. In the typical case of a simple memory read, for example, the control unit would cause the following steps to be taken: First, after reading from memory the machine-level instruction requesting the memory read, the address of the desired memory location would be loaded into the memory address register via a CPU bus; the control unit accomplishes this by asserting a signal which tells the memory address register to latch the data currently on the CPU bus. Once this is done, the control unit would initiate a read at the memory location specified in the memory address register by asserting a different control signal. Next, when the desired location has been read, the memory unit would make the value available on the CPU bus, and the control unit would assert another control signal causing the contents of the CPU bus to be latched into the memory data register. Here the value would be subsequently available, via the CPU bus, to any of the other functional units which require it.

Typically, machine-level instructions consist of at least two parts: an operation code or 'opcode' which specifies which operation is to be performed, and one or more address fields which specify where the data values (operands) used for that operation can be found. A computer executes one machine-level instruction in what may be called an instruction cycle, and an instruction cycle usually includes two parts. During the first part, called the fetch cycle, the opcode of the next instruction (the instruction pointed to by the PC) is loaded into the CPU's instruction register. Once the opcode is in the IR, the second part, called the execute cycle, is performed (often each of these parts will require more than one state time or clock cycle). In the execute cycle, the controller interprets the opcode and executes the instruction by sending out the appropriate sequence of control signals to cause data to be transferred or to cause an arithmetic or logical operation to be performed by the ALU. In many cases, the execution cycle of an instruction will include the fetching of operands specified by that instruction. For example, for a simple 'ADD' instruction, the location of two values to be added together must be specified in the instruction, and these two values must be fetched and brought into CPU registers so that the ALU will have access to them.

The collection of machine-level instructions that a CPU supports is called its instruction set. Within the computer, instructions are represented as sequences of bits arranged in memory words, identifying the constituent elements of the instruction. In addition to the opcode and the source operands (operands used as inputs for the specified operation), an instruction might also identify the desired destination of the operation's result, as well as the location of the next instruction to be executed. This suggests that a plurality of operand fields may exist for a given instruction. The arrangement of fields in an instruction is known as the instruction format. Depending upon how much information must be specified, an instruction can be one or more memory words long. Some simple instructions, like 'HALT', might require no operands, and can be represented in a single memory word containing only the opcode for that instruction. Other instructions, called unary instructions, might require the specification of a single operand. Unary instructions, such as 'BRANCH', 'INCREMENT', or 'CLEAR' can be contained in a single memory word containing both the opcode and the operand specifier, or in two words, one for the opcode and one for the operand specifier. Likewise, a binary instruction, like 'ADD' or 'SUBTRACT', requires the specification of two operands, and can be contained either in a single word which contains the opcode and the identity of both operands, or in two or more words. Frequently, a CPU's instruction set will include instructions of varying formats. In such a case, the CPU controller must decode an instruction's opcode, and then fetch additional words as required by the format associated with that particular instruction.

In order to reference a large range of locations in the specification of operands, the instruction sets of most computers support a variety of different methods, called addressing modes, for indicating the effective address of operands in a machine-level instruction. The simplest method of specifying an operand in a machine-level instruction is immediate or literal addressing, in which the value of the operand is included in the machine-level instruction itself. This mode is useful in defining constants and initial values of variables, and no main memory references are needed to obtain the operand. Likewise, a register addressing mode requires no main memory accesses, since the operand is stored in a CPU register which is specified in the machine-level instruction. Another simple form of operand specification is called direct addressing, wherein the main memory address of the operand is supplied in the instruction. Direct addressing requires only one memory reference to obtain the operand, but is limited to specifying addresses which are small enough to fit in the address field of the instruction, which can be smaller than one memory word. Indirect addressing modes overcome this limitation by providing in the instruction an address of a word in main memory which in turn contains a full length address of the operand. Two main memory accesses are required to obtain an operand specified in an indirect addressing mode. Other addressing modes commonly supported by processing units include register indirect addressing, in which a CPU register specified in the instruction contains the address in main memory of the desired operand, and various kinds of displacement addressing, in which an explicit offset value contained in the instruction is used as a displacement from another address included in the instruction, whose contents are added to the offset value to obtain the address of the operand.

Since the control unit is responsible for initiating all activity within a CPU, acceptable system performance depends upon efficient operation of the control unit. Two basic strategies exist for implementation of a control unit. The first, known as a hardwired controller implementation, involves the use of combinatorial logical hardware that produces the appropriate sequence of output control signals in response to a particular opcode. The primary inputs to a hardwired controller are the instruction register and a clock. The combinatorial logic in the hardwired controller identifies (decodes) the unique opcode associated with every instruction, and asserts the appropriate sequence of output control signals necessary to accomplish the requested task. Clearly, even for a moderately sized instruction set, the controller must contain a large amount of logic hardware for distinguishing between the many instruction formats that may be used, the many different operations that can be performed, and for asserting the correct control signals during the various phases of each of the various instruction cycles.

A simpler approach to the design of processor control units is known as a microprogrammed implementation. In a microprogrammed controller, each instruction opcode indicates an address in a special CPU memory where CPU control words called microinstructions are stored. Each microinstruction contains information about which control lines to assert when that microinstruction is executed by the controller. A single machine-level instruction thus corresponds to a specific sequence of one or more microinstructions to be executed (a microprogram routine). Microinstructions typically reside in a dedicated area of CPU read-only-memory (ROM) called the micro-store. Upon receiving an instruction's opcode in the IR, a microprogrammed controller would derive from the opcode an entry point into a microprogram routine in the microstore. Starting at this entry point, microinstructions are read one at a time from the micro-store, just as machine-level instructions are fetched from main memory, and used by the controller to determine which control signals to assert. In what is called a fully horizontal microinstruction format, each bit of a microinstruction corresponds to a single control signal, so that a one in a certain bit position corresponds to the assertion of that control signal, and a zero in the same bit position corresponds to the de-assertion of that control signal. Alternatively, with a so-called fully vertical microinstruction format, the bits of the microinstruction must themselves be decoded to determine which control signals to assert. In the fully horizontal format, n bits are required to represent the state of n control signals, while in the fully vertical format, n bits can be used to represent the state of $2^n$ control signals. A diagonal microinstruction format represents a compromise between the speed of the fully horizontal format and the small microinstruction size of the fully vertical format. In a diagonal format, the bits of a microinstruction are grouped into fields, where each field corresponds to the control signals associated with a particular system resource (main memory, ALU, CPU bus, CPU registers, and so on). A field of k bits can be used to specify up to $2^k$ control signals associated with a particular resource.

A computer is often characterized by the instruction set supported by its processing unit. The instruction set determines many of the functions performed by the CPU and thus has a significant effect on the implementation of the CPU and the overall performance of the computer system. In practice, at least two differing approaches to the design of instruction sets exist in the art. One, referred to as a complex instruction set, attempts to make the machine-level instructions more compatible with instructions of higher-level programming languages. Complex instruction sets typically include a large number of different instructions, ranging from simple operations such as MOVE, to more complex operations, such as vector manipulation, matrix operations, and sophisticated arithmetic functions. The instructions in a complex instruction set computer (CISC) usually support a wide range of operand addressing modes, and have widely varying formats. The use of complex instruction sets is based on the reasoning that since a complex instruction would do more than a simple instruction, fewer instructions would be needed for a given program, thus reducing the number of memory fetches involved in the execution of a program. The increasing availability of faster, larger ROMs further suggested that implementing complicated software functions in larger micro-code routines would result in faster, easier-to-use computers, and lower costs for software development.

An alternative approach to instruction set design employs a reduced instruction set. Reduced instruction set computer (RISC) architecture refers to a broad design philosophy characterized by an instruction set comprised of a relatively small number of simple instructions. The machine-level instructions in a RISC computer typically execute in one clock cycle, have fixed instruction formats, and support only a few simple addressing modes. In order to take full advantage of the speed of RISC instruction execution, RISC computers customarily employ hardwired controllers instead of microprogrammed controllers.

The general-purpose instruction set most commonly implemented in computers represents a compromise between the smaller program size and larger controller micro-store size of CISC architectures and the larger program size and smaller controller size of RISC systems. The wide variety of instruction formats and addressing modes in CISC systems makes instruction decoding and operand fetching slower and more involved, while the simpler operations and minimal addressing modes of RISC systems require relatively longer programs to accomplish similar tasks.

In a microprogrammed computer, the complexity of a machine-level instruction set clearly has an impact on the size of the micro-store containing the microinstructions to support the instruction set. The size of the microstore depends not only on the number of instructions supported, but also on the complexity of these operations and the range of addressing modes available to the instructions. The performance characteristics of the computer system are also affected by these factors, since complex instructions involve more CPU register transfers than simpler instructions and thus require more microinstructions and more clock cycles to complete. Furthermore, as the instruction set's complement of addressing modes increases, a larger amount of microcode is required for operand address calculation.

Microcode processing of operand specifiers involves dispatching to a microprogram routine which will perform the actions necessary to identify the location of an operand, and then taking the appropriate action based on the use of the operand in the given instruction. In lower performance systems, the processing of all specifier types may be done by a single general microprogram routine which resolves differences in operand specification by using conditional branching statements in the microprogram routine. Higher performance systems, on the other hand, may provide a dedicated microprogram routine for each possible combination of operand specifiers used with a particular machine-level instruction. This dedicated routine method allows the system to achieve maximum performance by eliminating the need for slow conditional branching within the microprogram. The general purpose routine method, on the other hand, requires much less micro-store memory space than the dedicated routine method, but is also slower.

The present invention is aimed at overcoming some of the undesirable features associated with the implementation of complex instructions sets which support a variety of operand addressing modes. Specifically, this invention suggests a strategy for reducing the micro-store memory dedicated to operand specifier processing, while also reducing the size and the time spent by a processor in obtaining the necessary operands specified in complex instructions.

SUMMARY OF THE INVENTION

This invention describes a method and apparatus for implementing high performance, low overhead microcoded operand specifier processing by grouping similar specifier types together and providing a general routine for each. Hardware primitives are then used to resolve the differences in specifier type within each group. In this way, the present invention combines the performance characteristics of the dedicated microprogram routine method of operand specifier processing with the minimal micro-store size of the general microprogram routine method of operand specifier processing.

The invention is directed towards computer systems which support many or all of the following thirteen operand addressing modes typically found in CISC architectures (it being understood that other names may be used for these modes, and that processors may employ additional modes or may omit some of these modes):

Literal

The operand is included as part of the specifier in the machine-level instruction stream;

Index

The address of the operand is calculated from a base address and an index contained in a general purpose CPU register;

Register

The operand is the value contained in a general purpose CPU register;

Register deferred

The main memory address of the operand is contained in a general purpose CPU register;

Auto-decrement

The address of the operand is calculated by subtracting the size of the operand from an address contained in a general purpose CPU register;

Auto-increment

The address of the operand in main memory is contained in a general purpose CPU register. The size of the operand is then added to the general purpose register;

Auto-increment deferred

An address contained in a general purpose CPU register is used to read from memory the address of the operand. A constant is then added to the general purpose register;

Byte displacement

The address of the operand is calculated by adding a byte displacement to the contents of a general purpose CPU register;

Byte displacement deferred

The sum of a byte displacement and the contents of a general purpose CPU register is used to read from memory the main memory address of the operand;

Word displacement

The address of the operand is calculated by adding a two-byte displacement to the contents of a general purpose CPU register;

Word displacement deferred

The sum of a two-byte displacement and the contents of a general purpose CPU register is used to read from memory the address of the operand;

Longword displacement

The address of the operand is calculated by adding a four-byte displacement to the contents of a general purpose CPU register.

Longword displacement deferred

The sum of four-byte displacement and the contents of a general purpose CPU register is used to read from memory the address of the operand.

The above collection of operand specification modes is one that is representative of the addressing mode sets commonly found in complex instruction set architectures. In addition, instruction set implementations frequently recognize the distinction between at least five different ways that operands may be used by a given instruction. This operand usage information must be provided to the memory unit during execution of a machine-level instruction so that the necessary access privilege to operand memory locations can be confirmed, and so that the memory access can be initiated. In particular, an instruction may require read access to an operand, write access to an operand, or both read and write (modify) access to the operand. Alternatively, an instruction might utilize only the address of an operand, and not the value of the operand; the address may be used alone, or as a base address with offset for an in-memory data structure. Furthermore, of the thirteen operand specifier types listed above, eight involve a general purpose CPU register; in some systems, the program counter can also be used in place of this general purpose register, increasing the number of different addressing modes from thirteen to twenty-one. Since an operand specified in one of these twenty-one modes can be used in any of five different ways, a microprogrammed controller supporting all of the above addressing modes and operand usages must be able to process operands in (21×5)=105 different ways.

With such a potentially large number of distinct ways to specify operands in a machine-level instruction, a dedicated routine approach to operand specifier processing would require an equally large number of individual routines for operand fetching, resulting in a very large micro-store. Likewise, a general routine approach would require a microroutine with a large number of inefficient conditional branch statements, resulting in extremely slow operand processing. The present invention suggests a novel solution to this problem wherein similar operand specifications are grouped together and processed by a microprogram routine dedicated to that group. By taking advantage of similarities among certain modes and usages, the number of dedicated routines can be minimized, and the amount of conditional branch statements in those routines can also be reduced.

The grouping of similar operand specifier types described by this invention is made according to several criteria: the type of operand (either byte, word, or longword), the level of indirection (either the operand is supplied, or the address of the operand is supplied, or the address of the address of the operand is supplied), the registers involved (either none, or general purpose registers, or the program counter), whether incrementing or decrementing is required, and the displacement, if any. After a grouping of operand specifiers has been determined, microprogram routines corresponding to each group are defined. As specified in the invention, each microprogram routine can begin execution at one of two different entry points, allowing for efficient resolution of differences in usage.

Although operand specifiers within a particular group are said to be similar, some differences will necessarily exist between any two, since each operand specifier is, by assumption, different from any other. In order to avoid conditionally branching within any of the dedicated microprogram routines, the present invention calls for the provision of a small collection of hardware units which function to resolve differences among specifiers of a common group. One of these hardware primitives is required for all operand specifiers which involve adding a displacement value to the contents of a CPU register. Since the displacement field in the machine-level instruction formats can be of varying sizes, this primitive is responsible for sign-extending the displacement in the instruction to 32 bits, and providing this 32-bit quantity to the dedicated microprogram routine. In this manner, the microprogram routines can treat all displacement values as 32-bit quantities, regardless of their original size. A second hardware primitive can be employed to determine the specified usage of an operand. Since either read and write and read/write (modify) usages are grouped together at one of the entry points in each dedicated routine, this second hardware primitive must determine which of these three usages is specified, and pass this information along to the memory interface upon completion of operand specifier processing. In this way, simple decoding hardware in the memory interface is able to confirm and initiate the necessary access to the operand's location (either read, write or modify access), once that location has been determined by the microprogram routine.

BRIEF DESCRIPTION OF DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings wherein:

DETAILED DESCRIPTION OF A PREFERRED EMBODIMENT

Although the present invention can be applied to any microprogrammed architecture which supports a diverse collection of operand addressing modes, a preferred embodiment is realized by implementing the invention within a machine conforming to the VAX architecture standard, as presently sold by the assignee of this invention.

Figure 1:
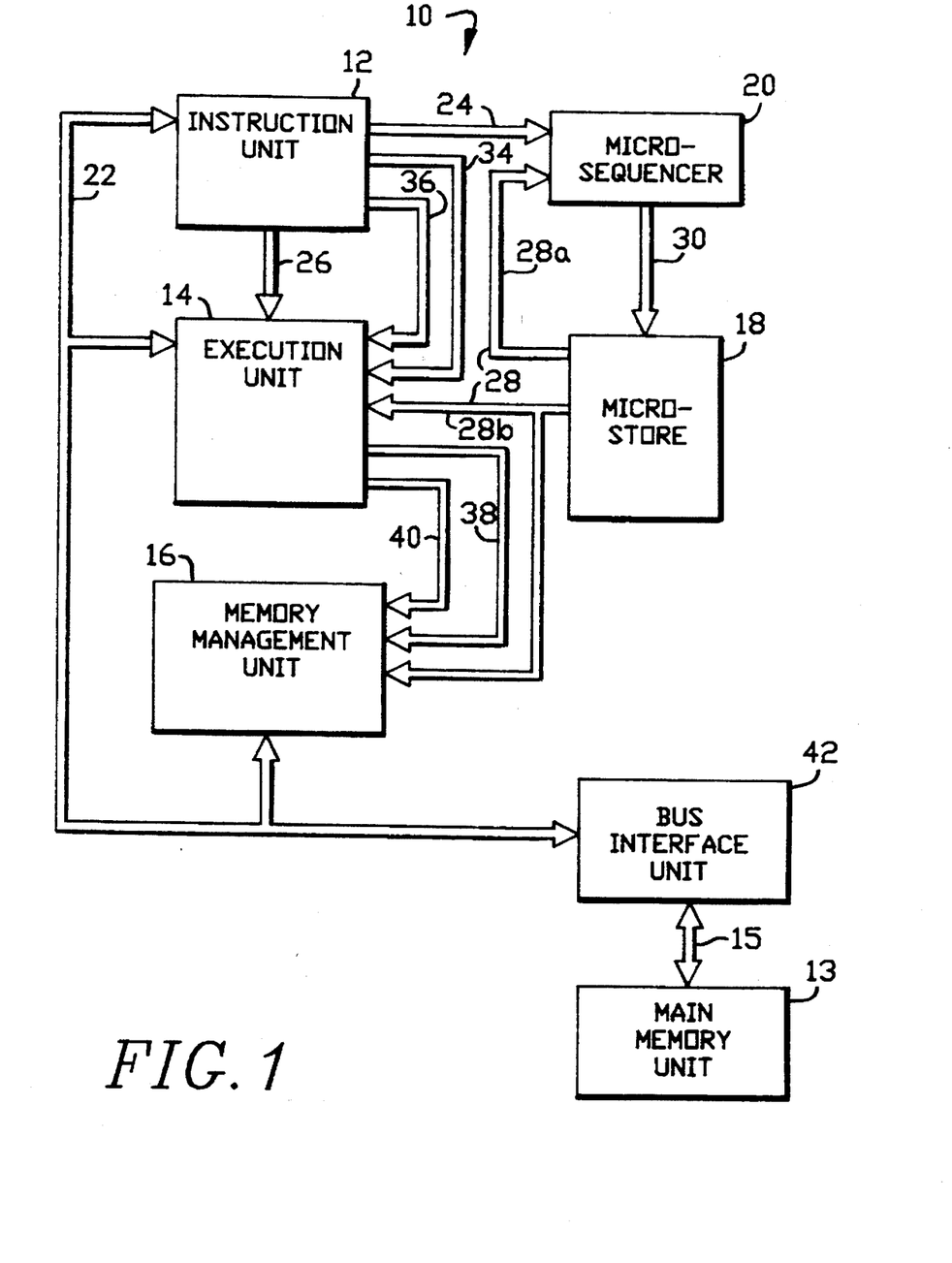
FIG. 1 is a block diagram showing the major functional units which comprise a central processing unit of a preferred embodiment of the invention.

FIG. 1 shows a simplified block diagram of a central processing unit (CPU) 10 of the preferred embodiment, which is comprised of a plurality of functional units hereinafter described:

An Instruction Unit 12 performs the instruction fetch subcycle of a machine-level instruction cycle; that is, a machine-level instruction is fetched from main memory 13 (or a cache memory) based upon an address in a program counter (PC). In addition, the Instruction Unit 12, decodes the opcode field of this machine-level instruction, and this decode determines the type of operand specifier(s) used in the machine-level instruction. The Instruction Unit 12 initiates the execution of all microprogram routines by supplying the microprogram routine entry address or dispatch address to the microprogram controller, in a manner described in detail below. When one microprogram routine terminates, the Instruction Unit 12 must dispatch the entry address of the next microprogram routine to be executed.

An Execution Unit 14 contains the functional facilities to implement the instruction set of the preferred embodiment. In particular, the Execution Unit 14 includes a collection of CPU registers, a program counter (PC)

register, and an arithmetic and logic unit (ALU). These CPU registers, in the usual manner, include temporary data registers, memory address registers, index registers, as may be required for executing the instruction set for the CPU.

A Memory Management Unit 16 contains logic used to control access to main memory 13, including instruction fetches as required by the Instruction Unit. The memory management unit will generate read and write controls to be applied to the bus interface unit which controls the system bus 15 by read and write controls and whatever acknowledge, ready, wait controls as may be needed, depending upon the specific system selected.

A Micro-store 18 is a ROM or other memory containing the microprogram routines needed to execute the instruction set of the system. A Microsequencer 20 includes logic that determines the address of the next microword to be fetched and executed from the Micro-store 18.

An Internal Data Bus 22 provides a data path connecting the various functional units 12, 14 and 16 and the bus interface unit. The Internal Data Bus 22 carries both read and write memory data and addresses between the above mentioned functional units, and usually includes control lines as well. Operands fetched from memory 13 (or cache) based upon an address in a memory address register in the execution unit 14, for example, are transferred via bus 22 into the execution unit 14 to the ALU input registers or busses or wherever specified by the microinstruction sequence.

A Dispatch Bus 24 carries micro-store entry addresses from the Instruction Unit 12 to the Microsequencer 20.

An Instruction Data Bus 26 provides a data path from the Instruction Unit 12 to the Execution Unit 14, for literal (immediate) data contained in the machine-level instructions. If a literal operand addressing mode is used in executing a given instruction, then data from the machine-level instruction itself is loaded to a data register in the execution unit 14 via lines 26.

A Microinstruction Bus 28 carries the current microinstruction to be executed from the Micro-store 18 to the Execution Unit 14, and to the Memory Management Unit 16. The individual conductor lines comprising the Microinstruction Bus 28 are divided into two groups 28a, 28b. The low-order bit lines 28a provide a path for next-microinstruction address information passed from the Micro-store 18 to the Microsequencer 20. The high-order bit lines 28b enable microprogram control bits to be delivered to the Execution Unit 14. Typically, a microinstruction may be comprised of fifty bits, for example, where sixteen bits are the address of the next microinstruction transferred on lines 28a, and the remaining thirty-four bits are applied to the execution unit (or memory management unit) via lines 28b.

A Microaddress Bus 30 is a 16-bit bus for transferring micro-store addresses from the Microsequencer 20 to the address input of the Micro-store 18.

A 3-bit Instruction Access Type Bus 34 carries three control bits from the Instruction Unit 12 to the Execution Unit 14, indicating the necessary memory access type for the operand specifier currently being processed. This 3-bit access-type control is generated in the instruction unit 12 by decoding part of the machine-level instruction.

A 2-bit Instruction Data Length Bus 36 carries two control bits from the Instruction Unit 12 to the Execution Unit 14 indicating the length (byte, word, or longword) of the memory data for the operand currently being accessed. Typically, a byte is 8-bit data, a word is 16-bit data, and a longword is 32-bit data.

A 3-bit Access Type Bus 38 enables the Execution Unit 14 to forward to the Memory Management Unit 16 the three control bits defining memory access type that were received from the Instruction Unit 12 via lines 34, so that the memory management unit can generate the read or write controls, bus access requests, or whatever is needed to pass onto the bus interface to implement the desired memory operation for the specified operands.

A 2-bit Data Length Bus 40 similarly enables the Execution Unit 14 to forward the two control bits defining the data length from the Instruction Unit 12 to the Memory Management Unit 16 so the memory management unit and bus interface operate on the desired data length to be fetched or written to memory 13 as specified by the machine-level instruction.

The Bus Interface Unit 42 provides the interface between the CPU 10 (particularly the bus 22 including data, address and control lines) and the external system bus 15 including address, data, and control signal lines, going to main memory 13.

The instruction set of the preferred embodiment supports a number of operand addressing modes; for example all of the thirteen addressing modes previously described and recited here may be implemented:

Literal Mode

Index Mode

Register Mode

Register Deferred Mode

Auto-decrement Mode

Auto-Increment Mode

Auto Increment Deferred Mode

Byte Displacement Mode

Byte Displacement Deferred Mode

Word Displacement Mode

Word Displacement Deferred Mode

Longword Displacement Mode

Longword Displacement Deferred Mode

In addition, the usage of operands specified in one of these modes can be specified to be one of five different types (these are the "access types" as defined by the three control bits on the lines 36 and 38):

Read Usage

Modify Usage

Write Usage

Address Usage

Bit Field Base Address Usage

Furthermore, eight of the above addressing modes involve the use of a general purpose data or address register in the execution unit 14 (the CPU) for which the Program Counter or PC Register in the CPU may be substituted. Substituting the Program Counter Register for a general purpose register in these eight modes results in eight addressing modes which are distinct from the thirteen listed above. This implies a total of twenty-one possible different ways to specify an operand, each of which can be used in one of five different ways, yielding (21×5)= 105 distinct combinations of addressing mode and usage specification.

According to the method specified by the present invention, the 105 combinations are grouped according to similarities in mode and usage to provide a number of "generic" operand modes each of which has steps which are implemented by microinstruction states so that a number of specific operand modes can be produced by slight modifications (not using microinstructions) implemented by the control bits 34 and 36. The preferred embodiment designates these twenty-two groups as follows:

1) Literal type; read, modify or write usage. An operand from the instruction itself is loaded via lines 26 to a data register of the CPU; this may involve only one or a very few microinstructions from microstore 18, i.e., "load input bus of CPU to register A", along with a microinstruction to memory management unit 16 to generate memory controls as defined by bits received via 36, 40 to direct the result of the arithmetic or logic operation which the opcode field of the instruction will require.

2) Literal type: address or bit field usage. This may be the same as 1) except the microinstruction bits to define memory controls will be different, i.e., will not allow read or write to memory 13.

3) Index type; read, modify or write usage. The microinstructions to implement index addressing will including accessing the machine level instruction via lines 26 to get the address of the general purpose register in the register file of the CPU acting as the index register, doing an ADD in the ALU using the contents of this index register, along with the contents of a memory address register in the CPU register file, as the A and B inputs to the ALU, then placing the results of the ADD in a memory address register to send out to the memory 13 via bus 22 and interface 42, using controls produced by memory management unit 16 from the microinstruction and from the control bits 34, 36 as in 1) to specify the memory access required. That is, the address generated by the ADD may be read from, written to, or both read and written (modify).

4) Index type: address or bit field usage. This will use the same microinstructions as 3), but with no read, write or modify of data in main memory 13.

5) Register type; read, modify or write usage. An operand will be one of the general purpose registers in the register file of the CPU, so the microinstructions for this generic type will merely access a field of the machine-level instruction via lines 26 to use as an address to pick out the register of the CPU, along with memory control bits as in 1).

6) Register type; address or bit field usage. This will have the same microinstructions as 3), but with the memory controls as in 2).

7) Register deferred type; read, write or modify usage. The address of an operand is in one of the general purpose registers, so the microinstructions for this generic type will access a field of the machine-level instruction via lines 26 to use as an address to select one of the registers of the CPU register file, then will send out the contents of the selected register via the bus 22 and bus interface 16 to the memory 13, then also direct the memory management unit to perform the memory access type defined on the control bits 38.

8) Register deferred type; address or bit field usage. This will produce microinstructions, as in 7) but with no memory read, write or modify.

9) Auto-decrement type; read, modify, or write usage. The microinstructions to implement this type would transfer a field of the machine-level instruction via bus 26 to an input of the ALU of the CPU, direct a register of the CPU register file to the other input of the CPU, do a SUBTRACT operation in the ALU, then use the result as an operand address by sending it out on the address lines of bus 22. Memory controls would be generated using the control bits 38 (and data size defined via lines 40).

10) Auto-decrement type; address or bit field usage. The microinstructions would be the same as 9), but there would be no memory read, write or modify.

11) Auto-increment type with general purpose register; read, write or modify usage. Microinstructions here would be the same as for 9), but an ADD would be done instead of a SUBTRACT.

12) Auto-increment type with general purpose register; address or bit field usage. Microinstructions are same as 1) but with no memory read, write or modify; i.e., the address itself is used as an operand.

13) Auto-increment type with PC as the register; read, write or modify usage. Microinstructions are same as for 11), but the PC instead of a general purpose register is used, as the second input of the ALU for the ADD operation.

14) Auto-increment type with PC as the register; address or bit field usage. Same as 10) but using PC as the second ALU input as in 13).

15) Auto-increment deferred type with general purpose register; read, modify or write usage. Microinstructions will be the same as for 11), but the contents of the location for which the address was generated at the ALU output is itself used as the address of the operand.

16) Auto-increment deferred type with general purpose register, address or bit field usage. Same as 15), but the operand specified would not be read, written or modified, but instead the address of this operand itself would be used by the opcode.

17) Auto-increment deferred type with PC as the register; read, modify or write usage. Microinstructions are the same as for 15), but use the PC as the second input to the ALU for the ADD operation.

18) Auto-increment deferred type with PC as the register; address or bit field usage. Same as 16), but no read, write or modify.

19) Byte, word or longword displacement type; read, modify or write usage. Microinstructions use the 32-bit sign-extended input via bus 26 as one input of the ALU and the contents of a general purpose register are used as the other ALU input; the ALU performs an ADD, and the result is loaded to a memory address register of the CPU and used as the address of the operand. Also, the controls for a memory access are generated, while the specific memory usage (read, write, or modify) is specified by the 3-bit controls, and the data length (byte, word or longword) specified by the 2-bit controls.

20) Byte, word or longword displacement type; address a bit field usage. Same as 19), but no read, write a modify of the operand is done in memory 13.

21) Byte, word or longword displacement deferred type; read, modify or write usage. Same as 19), but the contents of the address in memory 13 generated is read from memory 13 and used as the address of the operand.

22) Byte, and a longword displacement deferred type; address or bit field usage. Same as 21), but the operand thus defined is not read, written or modified, but instead the address itself is used.

For this invention, a microprogram routine (a sequence of one or more microinstructions) will be defined for each of the generic addressing mode groups listed above, and further each microprogram routine is executed entirely as outputs from the micro-store 18, beginning at the entry point addresses or dispatches sent on lines 24 to the sequencer or address generator 20 and proceeding with no conditional branches or the like in the sequence of microinstructions. These entry points are in pairs; the first corresponds to operands specified in that group's addressing mode which are to be read, modified or written; the second entry point corresponds to instances when the address of the specified operand is to be used, or when the address of the operand is to be used as a base address for an in-memory bit field. In this manner, twenty-two microprogram routine entry points are defined for operand specifier processing, instead of one (as would be the case in a general routine implementation) or 105 (as would be the case in a fully dedicated routine implementation).

Operation of the processing unit 10 proceeds as follows: The Instruction Unit 12 receives a machine-level instructions via the Internal Data Bus 22 from the memory 13 to start an instruction cycle. The Instruction Unit 12 is responsible for extracting from a machine-level instruction all encoded and decoded instruction stream information that is required during the execution of microroutines which accomplish the requested operation. This information includes the opcode, registers specified, operand specifiers, operand usage/access type, operand data lengths, operand destinations, information about the next value of the Program Counter Register, and other control and status information. Operand access type and data length information is decoded from the opcode by the Instruction Unit 12 and provided to the Execution Unit 14 via the dedicated, 3-bit Instruction Access Type Bus 34 and 2-bit Instruction Data Length Bus 36, respectively.

The Execution Unit 14 forwards this access type and data length information to the Memory Management Unit 16 via the Access Type Bus 38 and Data Length Bus 40, respectively. The Memory Management Unit 16 uses this information as it initiates memory accesses to the required locations. Specifically, a simple hardware primitive circuit (i.e., a decoder) in the Memory Management Unit 16, quickly decodes the bits on the Access Type Bus 38 in order to determine if the specific access type to initiate at the memory location corresponding to the currently requested memory access, if a read, write or modify is to be done. As noted above, these access types include read, write, modify (also referred to as "read/modify/write"), address (i.e., the address itself is used with no read, write or modify), and bit field. If the access type is "address or bit field" then the execution unit itself implements the specified "access type" operation. The data size of this access is indicated on the Data Length Bus 40.

While the Instruction Unit 12 is classifying the operand specifier into one of the twenty-two groups of addressing modes, the Instruction Unit 12 also decodes the access type bits in the machine-level instruction for that operand. This information, in conjunction with the operand specifier group classification determines which one of the twenty-two microprogram routine entry points should be used to initiate processing of the corresponding operand specifier. This entry address is then passed from the Instruction Unit 12 to the Microsequencer 20 via Dispatch Bus 24. The Microsequencer 20 then initiates microprogram execution at this point by sending the entry address to the Micro-store 18 via the Microaddress bus 30. As sequences of microwords are read from the Micro-store 18 they are made available to the Execution Unit 14 and the memory management Unit 16 on the Microinstruction Bus 28. The low-order sixteen bit lines 28a of the Microinstruction Bus 28 are routed back to the Microsequencer 20 so that these bits of the microinstruction can be used by the Microsequencer 20 to determine the micro-store address of the next microinstruction to be executed. The remaining high-order bit lines 28b of the Microinstruction Bus 28 are routed to the Execution Unit 14, providing a path for the bits of the individual microinstruction that are used to control the activity in the Execution Unit 14, e.g., reading or loading the various registers, operating the ALU, I/O to the busses 26, 32 and the like, in the usual manner of a microcoded CPU.

Literal or immediate data contained in machine-level instructions, such as addressing mode displacement values, are forwarded by the Instruction Unit 12 to the Execution Unit 14 via the Instruction Data Bus 26, so that they are available to the Execution Unit 14 for the computation of operand addresses and operands. Displacement values specified in machine-level instructions can be 8-bit, 16-bit or 32-bit quantities. A hardware primitive circuit (i.e., decoder and logic circuit) residing in the Instruction Unit 12 is responsible for sign extending (if necessary) all displacements so that they all become 32-bit quantities. In this way, 32-bit displacement values are passed from the Instruction Unit 12 to the Execution Unit 14 via the Instruction Data Bus 26, where all displacements can be uniformly treated as 32-bit quantities regardless of their originally specified size.

The execution of each machine-level instruction requires the execution of several microprogram routines. First, one of the twenty-two generic microprogram operand specifier processing routines must be executed for each of the operand specifiers in the machine level instruction word, so that these operands can be read from main memory under control of the Memory Management Unit 16 and provided to the Execution Unit 14. The VAX Architecture Standard defines machine-level instructions which have up to six operands specified. Only after all operand specifiers have been processed may another microprogram routine be executed to initiate the execution of the requested operation on the operands.

Upon completion of the execution of the operation requested in a machine-level instruction, the next machine-level instruction pointed to by the PC is fetched from main memory, and the entire process above is repeated for this instruction.

While this invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will be construed to cover any such modifications or embodiments as fall within the true scope of the invention.

What is claimed is:

1. A method of specifying operands for an instruction executed in a microcoded CPU, where each of said operands uses one of a plurality of different generic operand addressing modes, and where a plurality of different data lengths and different access types may be used with at least some of said plurality of different generic operand addressing modes, the microcoded CPU including a single micro-store containing a microprogram having a set of generic microinstruction sequences, the method comprising the steps of:

grouping operand types having a similar one of said plurality of different generic operand addressing modes, and defining a generic microinstruction sequence in said set of generic microinstruction sequences for each of said groups of operand types, decoding said instruction in said CPU to select one of a set of dispatch addresses for selecting one of said generic microinstruction sequences in said set of generic microinstruction sequences, addressing said micro-store in said CPU beginning at an entry point determined by said selected dispatch address and continuing to address said micro-store without conditional branching to produce said selected one of said generic microinstruction sequences, applying said selected one of said generic microinstruction sequences from said micro-store to an execution unit of the CPU to fetch or select operands for said instruction, from a register in said CPU, or from a memory separate from said CPU, said operands being fetched or selected in response to said one of said plurality of different generic operand addressing modes, and separately decoding said instruction in said CPU to generate control bits separate from said dispatch address and apart from said micro-store to select a specific operand mode from a set of a plurality of specific operand modes, each one of said set of specific operand modes producing one of said plurality of different data lengths and different access types, and applying said control bits to said execution unit of said CPU separately from said sequence of microinstructions, said execution unit selecting a specific operand mode in response to said control bits for said fetch or select of operands.

2. A method according to claim 1 wherein said set of generic microinstruction sequences includes N microinstruction sequences and said set of specific operand modes includes M specific operand modes, where N and M are greater than 2, whereby said microinstruction sequences in said set of generic microinstruction sequences are of a number which is much less than N times M.

3. A method according to claim 1 wherein said specific operand modes include addressing operands of different data lengths.

4. A method according to claim 1 wherein said specific operand modes include memory control functions of read and write.

5. A method according to claim 1 wherein said generic operand addressing modes include at least one displacement type generic addressing mode in which data of variable length is included along with said instruction as a displacement and said displacement is added to a value in a register in said execution unit.

6. A method according to claim 5 wherein said specific operand modes include modes requiring at least two different data lengths for said displacement.

7. A method according to claim 6 including the step of sign-extending said displacement received by said execution unit from the instruction to a maximum data length of said plurality of different data lengths.

8. A method according to claim 1 wherein said set of generic operand addressing modes includes at least one literal addressing mode, at least one index addressing mode, and at least one register addressing mode.

9. A method according to claim 8 wherein said set of generic operand addressing modes includes two of said literal addressing modes, one of said literal addressing modes providing for reading or writing to an address in memory, and another of said literal addressing modes providing for defining said address without reading or writing to said address in memory.

10. A method according to claim 9 wherein said set of specific operand modes includes a specific mode for reading and a specific mode for writing.

11. Apparatus for processing operand specifiers for an instruction executed in a microcoded CPU, where each one of said operand specifiers may require one of a plurality of different generic operand addressing modes and one of a plurality of different operand modes, comprising:

means for grouping operand types having a similar one of said plurality of different generic operand addressing modes, and means for defining a generic microinstruction sequence in a set of generic microinstruction sequences for each of said groups of operand types, decoding means in said CPU receiving said instruction and decoding said instruction to generate a dispatch address for a selected one of said generic microinstruction sequences, a single microstore in said CPU storing said set of generic microinstruction sequences, said microstore having an address input and a microinstruction output, and addressing means for said microstore receiving said dispatch address and applying microstore addresses to said address input of said microstore beginning at an entry point determined from said dispatch address received from said decoding means and continuing through microstore addresses for said selected one of said generic microinstruction sequences without conditional branching, said microstore producing microinstructions at said microinstruction output in response to said microstore addresses, said microinstructions corresponding to the selected one of said generic microinstruction sequences, execution and addressing means in said CPU having a plurality of registers, a bus, and memory addressing means, said execution and addressing means being connected to said microinstruction output and responsive to said microinstructions to fetch or select operands for said instruction from a register of said plurality of registers in the CPU or from memory separate from the CPU using said bus and memory addressing means according to said selected one of said generic microinstruction sequences corresponding to one of said generic operand addressing modes, means for separately decoding said instruction to generate control bits separate from said dispatch address to select one of said plurality of different operand modes, and means for applying said control bits to said execution and addressing means separately from said microinstruction sequence, said bus and memory addressing means being responsive to said control bits to use said selected one of said operand modes by said bus and memory addressing means in responding to said selected one of said generic microinstruction sequences for said fetch or select of operands.

12. Apparatus according to claim 11 wherein said set of generic microinstruction sequences includes N microinstruction sequences and said set of different operand modes includes M different operand modes, where N and M are greater than 2, whereby said microinstruction sequences in said set of generic microinstruction sequences are of a number which is much less than N times M.

13. Apparatus according to claim 11 wherein said different operand modes include addressing operands of different data lengths.

14. Apparatus according to claim 11 wherein said different operand modes include memory control functions of read and write.

15. Apparatus according to claim 11 wherein said generic operand addressing modes include at least one displacement type generic addressing mode in which data of variable length is included along with said instruction as a displacement and said displacement is added to a value in a register of said plurality of registers in said execution and addressing means.

16. Apparatus according to claim 15 wherein said different operand modes include modes requiring at least two different data lengths for said displacement.

17. Apparatus according to claim 16 including means for sign-extending said displacement received by said execution and addressing means from the instruction.

18. Apparatus according to claim 11 wherein said set of generic operand addressing modes includes at least one literal addressing mode, at least one index addressing mode, and at least one register addressing mode.

19. Apparatus according to claim 18 wherein said set of generic operand addressing modes includes two of said literal addressing modes, one of said literal addressing modes providing for reading or writing to an address in memory, and the other of said literal addressing modes providing for defining said address without reading or writing it in memory.

20. Apparatus according to claim 19 wherein said set of different operand modes includes a specific mode for reading and a specific mode for writing.

* * * * *